US008957807B2

(12) United States Patent  
Mills et al.

(10) Patent No.: US 8,957,807 B2  
(45) Date of Patent: Feb. 17, 2015

(54) INTERNAL MULTI-AXIS G SENSING USED TO ALIGN AN AUTOMOTIVE FORWARD RADAR TO THE VEHICLE'S THRUST AXIS

(75) Inventors: Aaron L. Mills, Ann Arbor, MI (US); Scott Howard Gaboury, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 582 days.

(21) Appl. No.: 13/325,090

(22) Filed: Dec. 14, 2011

(65) Prior Publication Data

US 2013/0154870 A1 Jun. 20, 2013

(51) Int. Cl.
*G01S 13/00* (2006.01)
*G01S 7/40* (2006.01)

(52) U.S. Cl.
USPC ............. 342/165; 342/70; 342/173; 342/174; 342/175

(58) Field of Classification Search
USPC ............................... 342/70–72, 165, 173, 174
See application file for complete search history.

(56) References Cited

U.S. PATENT DOCUMENTS

| | | | | |
|---|---|---|---|---|
| 4,489,322 A | * | 12/1984 | Zulch et al. | 342/149 |
| 5,184,137 A | * | 2/1993 | Pozgay | 342/174 |
| 5,455,592 A | * | 10/1995 | Huddle | 342/359 |
| 5,623,270 A | * | 4/1997 | Kempkes et al. | 342/372 |
| 6,202,027 B1 | * | 3/2001 | Alland et al. | 701/301 |
| 6,441,779 B1 | * | 8/2002 | Bennett et al. | 342/357.36 |
| 6,640,609 B1 | * | 11/2003 | Nadkarni et al. | 73/1.37 |
| 6,691,074 B1 | * | 2/2004 | Moriya et al. | 702/190 |
| 6,901,122 B2 | * | 5/2005 | Nadgauda et al. | 375/347 |
| 7,098,844 B2 | * | 8/2006 | Orr et al. | 342/174 |
| 7,123,201 B2 | * | 10/2006 | Caudle | 343/709 |
| 8,441,394 B2 | * | 5/2013 | Alland | 342/70 |
| 2002/0170193 A1 | * | 11/2002 | Townsend et al. | 33/512 |
| 2004/0085096 A1 | * | 5/2004 | Ward et al. | 327/2 |
| 2004/0148057 A1 | * | 7/2004 | Breed et al. | 700/242 |
| 2004/0155811 A1 | * | 8/2004 | Albero et al. | 342/70 |
| 2006/0055583 A1 | * | 3/2006 | Orr et al. | 342/20 |
| 2006/0132356 A1 | * | 6/2006 | Dulac | 342/173 |
| 2007/0034731 A1 | * | 2/2007 | Falco | 244/3.1 |
| 2007/0194982 A1 | * | 8/2007 | Stove | 342/174 |
| 2008/0082263 A1 | * | 4/2008 | Chauncey et al. | 701/213 |
| 2008/0158046 A1 | * | 7/2008 | Kai | 342/118 |
| 2010/0017128 A1 | * | 1/2010 | Zeng | 701/301 |
| 2011/0050525 A1 | * | 3/2011 | Sanada et al. | 343/760 |
| 2011/0234452 A1 | * | 9/2011 | Hol et al. | 342/174 |
| 2011/0276216 A1 | * | 11/2011 | Vaughan | 701/29 |
| 2011/0285571 A1 | * | 11/2011 | Jeong et al. | 342/27 |
| 2013/0002489 A1 | * | 1/2013 | Erad et al. | 342/432 |
| 2013/0015999 A1 | * | 1/2013 | Alland | 342/70 |
| 2013/0335569 A1 | * | 12/2013 | Einecke et al. | 348/148 |

* cited by examiner

*Primary Examiner* — Peter Bythrow
(74) *Attorney, Agent, or Firm* — Joseph E. Root

(57) ABSTRACT

A motor vehicle includes a vehicle floor, a tilt sensor attached to the vehicle floor and having an output, and a forward looking radar module attached to the vehicle. The radar module includes a radar, an accelerometer; and an output from the accelerometer, and a controller that averages the tilt sensor output and the accelerometer output and determines a difference between the output averages, the controller reporting when the differences changes more than a predetermined amount. A method of calibrating the forward looking radar module, when attached to a vehicle, comprises placing the vehicle on a flat surface to determine the accelerometer pitch.

2 Claims, 2 Drawing Sheets

INTERNAL MULTI-AXIS G SENSING USED TO ALIGN AN AUTOMOTIVE FORWARD RADAR TO THE VEHICLE'S THRUST AXIS

BACKGROUND

This application relates generally to the field of forward looking radar systems and, more particularly, to insuring proper physical alignment of forward looking radar systems on vehicles.

Forward looking radar systems are quite common now for vehicle features such as; adaptive cruise control, forward collision warning, and pre-crash braking. To ensure proper operation, the radar must be properly aligned to the vehicle's horizontal thrust direction, and must be aligned parallel with the road surface. In addition, the vehicle must be aligned properly in relation to the road. The common solution utilizes a radar module bracket that aligns the radar to the vehicle. Such brackets may have adjustment mechanisms and in-plant assembly and service procedures developed to align the radar.

More particularly, a forward looking radar module and bracket system is in production today on several car lines. The radar sensor is mounted to body structure behind the car's front fascia and "looks" forward down the road up to 150 meters or more. The module must be physically aligned horizontal to the ground (approximately +1 degree accuracy), and parallel to the vehicles thrust axis (approximately +1 degree accuracy). In this type of radar bracket system, alignment is controlled with a sophisticated, robust, and expensive bracket system designed to account for all vehicle build variations, and a post-build vehicle radar based target procedure is used to confirm proper alignment. With this type of bracket system, manual alignment changes are typically not performed online to maintain vehicle build throughput rates, although alignment service can occasionally be performed in an off-line environment if repair is required.

Multiple copies of the radar alignment system are required in the vehicle manufacturing process to provide adequate throughput cycle times. A primary failure mode of the radar based target alignment checking procedure is that the system can fail if the radar targets are not in the proper design position. Target misalignment can occur due to alignment mechanism wear or damage for example. An alternate radar alignment method, using a laser beam reflected from the module, is also difficult to implement and maintain. Additionally design considerations must be taken to allow for hitting the hidden module with an external laser beam, which is problematic and can have significant implications on vehicle styling and cost.

It would be desirable to have a method to allow the module to self-report its orientation, using gravity as a reference, and possibly the thrust axis information, if required. This method would allow the radar to diagnose without external equipment, and would provide an opportunity for continuous diagnostics, which is not possible with today's alignment system. It will be desirable, in addition, to establish an internal radar orientation measurement system would avoid the cost, labor, throughput impact, and failure modes of using external radar alignment equipment.

It would also be beneficial to develop an alignment method immune to vehicle changes, such as vehicle model and ride height, and positioning within the alignment stations.

SUMMARY

A multi-axis accelerometer built into a radar module makes this possibility. The most direct measurement of gravity and thrust access can then provide the shortest path (fewest failure modes) toward accurate alignment.

By utilizing an internal 3 axis low-g accelerometer, it is possible to allow the radar module to self diagnose its orientation and provide correcting information to an operator to adjust the radar's position.

More particularly, this disclosure provides a motor vehicle including a vehicle floor, a tilt sensor attached to the vehicle floor and having an output, and a forward looking radar module attached to the vehicle. The radar module includes a radar, an accelerometer; and an output from the accelerometer, and a controller that averages the tilt sensor output and the accelerometer output and determines a difference between the output averages, the controller reporting when the differences changes more than a predetermined amount.

This disclosure also provides a method of calibrating the forward looking radar module, when attached to a vehicle, comprises placing the vehicle on a flat surface to determine the accelerometer pitch. The accelerometer gives in-plant, in-service and on-going diagnostics of the radars vertical alignment. If misalignment occurred through the manufacturing procedure, or after a vehicle crash, it could be diagnosed.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

DEFINITIONS

As used herein, the following terms have the indicated meaning.

g—acceleration with in relation to a free falling object.

pitch—a measure of the degree to which something is angularly displaced up or down relative to a horizontal plane.

yaw—a measure of the degree to which something is angularly displaced to the left or right relative to a vertical plane.

Overview

In general, this disclosure is directed to an automobile incorporating a forward looking radar system used for a variety of features including adaptive cruise control, forward collision warnings, pre-crash braking and other similar applications. More specifically, the forward looking radar must be properly aligned to the vehicle's horizontal thrust direction, and must be aligned properly in relation to the road. In order to align the forward looking radar, the radar system itself incorporates a three axis low-g accelerometer that gives ongoing diagnostics of the radar's alignment. Should misalignment occur during the manufacturing process or even after a vehicle crash, the accelerometer will diagnose such a misalignment and report this misalignment as a trouble code to the operator.

Exemplary Embodiments

Figure 1:
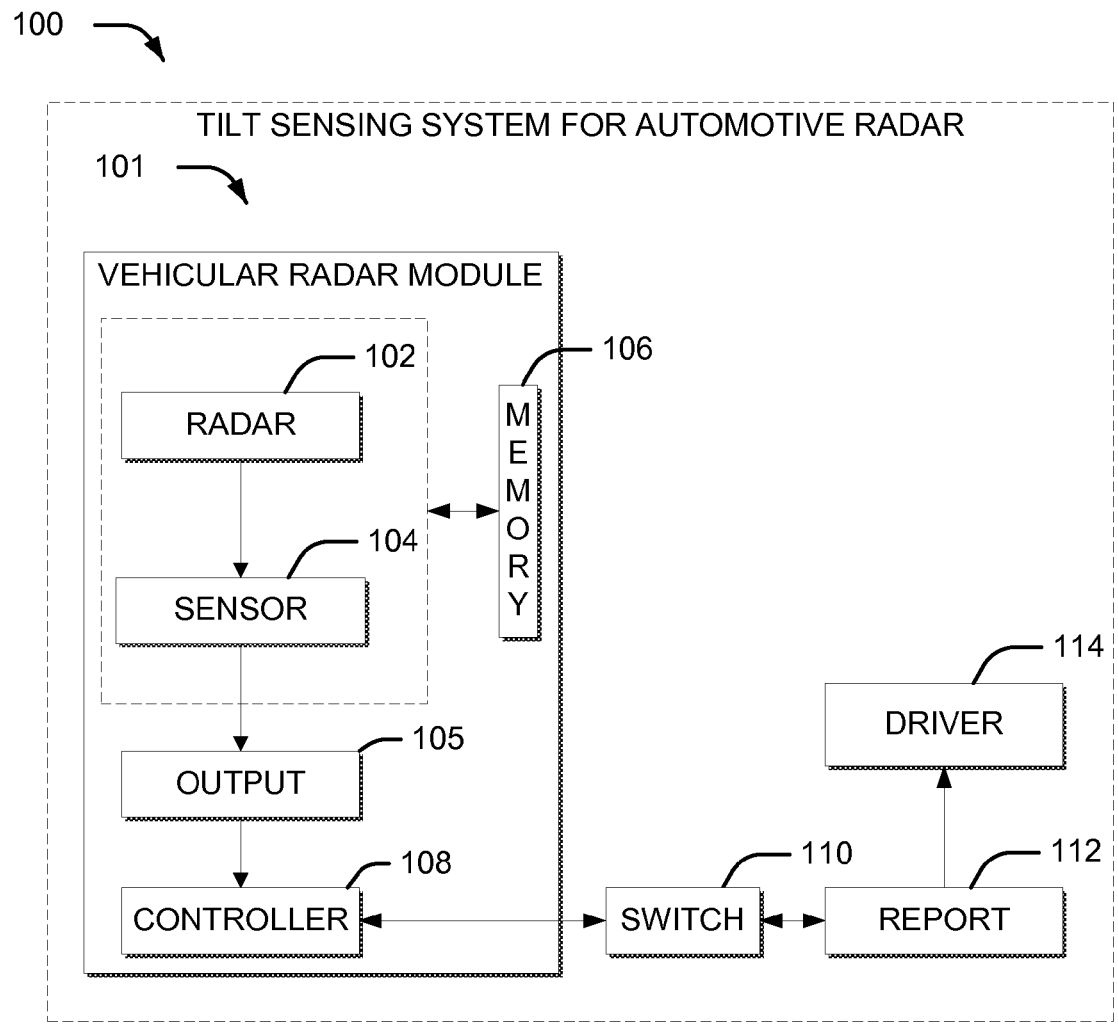
FIG. 1 is a schematic of a tilt sensing system for an automotive radar according to the present disclosure.

FIG. 1 illustrates an exemplary tilt sensing system 100 for an automotive radar comprising a forward looking radar module 101. The radar module 101 includes a radar 102, a accelerometer 104 attached to the radar module 101, an output from the accelerometer 104, configured as an accelerometer output 105, a memory device 106, and a controller 108 connected to the accelerometer output 105. The memory device 106 and controller 108 can be located either inside the radar module 101, or outside the radar module 101. The radar module 101 further comprises an on/off switch 110 that enables the radar 102 to switch between activated and deactivated modes. A report 112 is generated by the controller 108, which can be presented to the driver 114 or recalled by a service technician, as described further below.

The radar module 101 is configured as a housing for the radar 102, the accelerometer 104, and the controller 108, and is accordingly space efficient and compact in dimensions. The radar module 101 can thus be accommodated or attached under the vehicle's hood, within the vehicle's front grill, or under the vehicle's front chassis.

The radar 102, housed within the radar module 101, is adapted to scan and monitor vehicles, infrastructure, and other objects, positioned in front of the driven vehicle. Such monitoring is enabled, for example, through a 75 GHz microwave beam generated by the radar 102. The radar 102 monitors all objects falling within the radar's scanning range, the beam making an angle of ±1° to the vehicle's horizontal thrust direction up to a range of 150 meters or more.

Being housed within, and attached to the radar module 101, the accelerometer 104 is configured to sense radar alignment, both during radar module 101 installation, as well as during vehicular movements. More particularly, the accelerometer 104 described in the disclosure is a low-g accelerometer. A typical low-g accelerometer such as the ADXL345 from Analog Devices, Inc., can be used. Acceleration sensor should be able to report tilt to less than a 1 degree and theoretically to +0.25 degrees (1 LSB) accuracy in relation to gravity. Operating over a temperature range of −40° C. to +125° C., ADIS16209 can be attached internally to the radar module 101 using standard solder reflow processes.

The built-in memory device 106, in the radar module 101, is configured to store information related to radar tilt, and is coupled to the assembly of accelerometer 104 and the radar 102 through a cabled medium. Memory device 106 primarily comprises a single portion of a volatile memory for temporary storage of information. Alternatively, the memory device 106 may comprise multiple portions of a combination of volatile and non-volatile memories, depending upon requirements related to long-term data availability.

The controller 108 connected to the accelerometer output 105, is configured to determine the position of the radar 102 relative to a gravity vector. Particularly, the controller 108 is configured to provide diagnostic information related to radar tilt during vehicular movements through the report 112. Report 112 is generated based on radar alignment sensed by the accelerometer 104 and provided through the output 105. The alignment information can be continuously fed to the driver 114, to a mechanic during servicing, or to an operator during the radar module 101 attachment to a vehicle, through the controller 108. More particularly, the report 112 can be fed through a digital, analog, or LED display, or even through a register in a CPU. A vehicle occurrence that causes the radar module 101 to be improperly aligned, the controller 108 can shut down the radar 102 by operating the on/off switch 110. Connected to the accelerometer output 105 via cabled means, the controller 108 may be a microprocessor based control system adapted within the radar module 101. Further, the controller 108 may include appropriate input and output circuits of a known type for receiving input signals and for transmitting processed signals as outputs to certain actuators (not shown) employed therein.

During an adaptive cruise control mode, the driver 114 of a vehicle may not focus on the road conditions at all times, as one would during normal driving. During such modes, the radar 102, mounted to the vehicle continuously assists in vehicular maneuvers. Such assistance includes establishing optimized braking and acceleration patterns, depending upon the distance monitored from the surrounding traffic and infrastructure. The accelerometer 104, being configured to sense tilt in the radar module 101 during regular periods of vehicular operation, enables the controller 108, functioning through an operational circuit, to generate diagnostic reports based on the output 105 obtained from the accelerometer 104. In another embodiment, the controller 108 could be configured to generate audible or visual warnings, or alarms upon such radar deviations or deactivations.

Figure 2A:
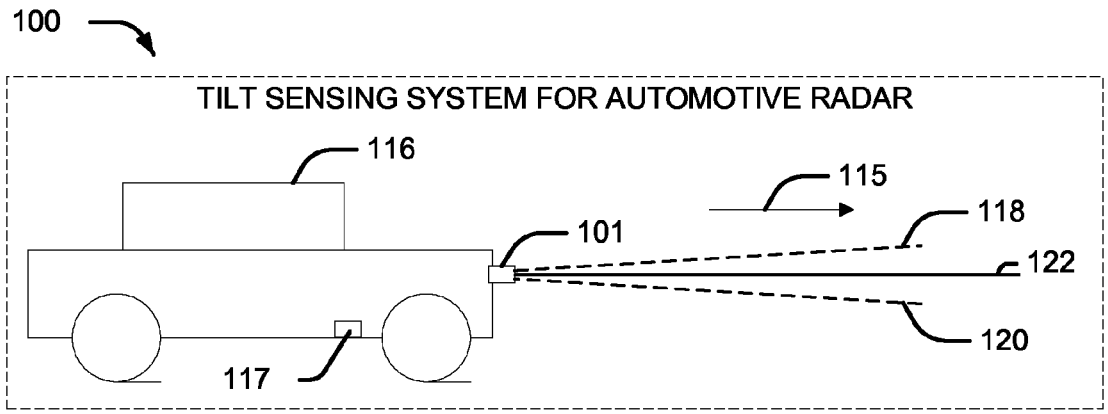
FIG. 2A is a schematic of a vehicle equipped with an exemplary tilt sensing system for an automotive radar, working in an ideal condition.

FIG. 2A depicts the tilt sensing system 100 applied in a vehicle 116, with the vehicle 116 operating in the adaptive cruise control mode. This method employs attaching the accelerometer 104 to the radar module 101 to sense radar alignments. The tilt sensing system 100, comprising the radar module 101, is employed within the vehicle's front grill as shown. The radar 102 housed in the radar module 101 maintains optimal monitoring of the surrounding vehicles and infrastructure by maintaining the radar beam 122 parallel to the vehicle's horizontal thrust direction 115 as shown by the arrow. Importantly, the figure depicts an upper beam limit 118 and lower beam limit 120, both lying symmetrically opposite to the radar beam 122.

The upper beam limit 118 and the lower beam limit 120 are primarily the predetermined thresholds beyond which the functioning of the radar beam 122 during an adaptive cruise control mode becomes ineffective.

As disclosed for FIG. 1, sensing and reporting of the radar's alignment to the vehicle's horizontal thrust direction 115 is performed continuously through the accelerometer 104 and the controller 108, respectively.

Figure 2B:
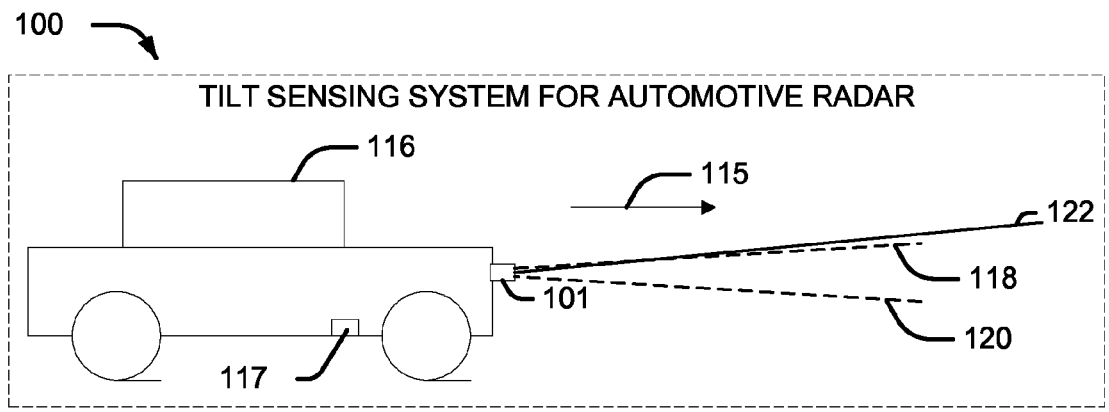
FIG. 2B is a schematic of a vehicle equipped with an exemplary tilt sensing system for an automotive forward radar, with the radar tilting beyond an upper limit.
Figure 2C:
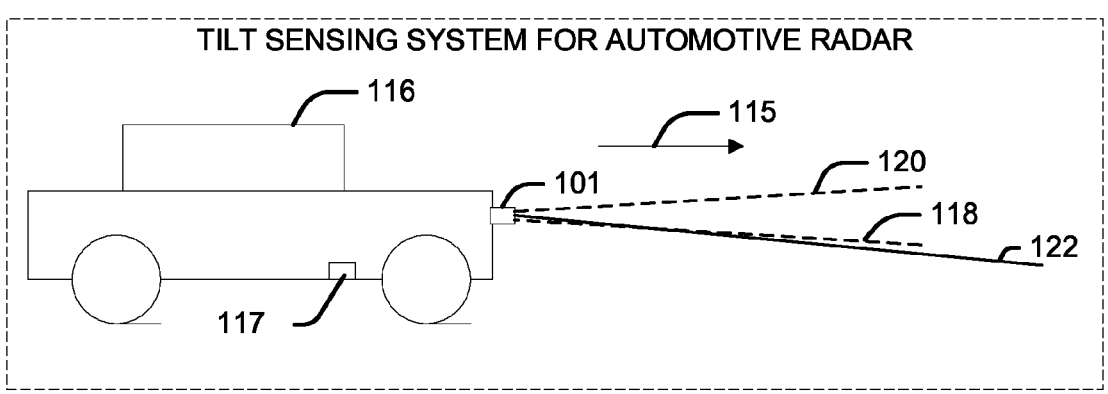
FIG. 2C is a schematic of a vehicle equipped with an exemplary tilt sensing system for an automotive forward radar, with the radar tilting beyond a lower limit.

FIG. 2B depicts the condition when a tilt in radar module 101 has caused the radar beam 122 to have deviated beyond the upper beam limit 118. Similarly, FIG. 2C depicts the condition when a tilt in radar module 101 has caused the radar beam 122 to have deviated beyond the lower beam limit 120.

Both the above noted conditions of the radar beam 122 deviating beyond the upper beam limit 118 and the lower beam limit 120, respectively, are deemed insecure and inappropriate for effective vehicular operation during an adaptive cruise control mode. Such conditions upon being sensed through the accelerometer 104, signals the controller 108 through the output 105 to report the radar tilt, and further deactivates the radar 102 through the on/off switch 110.

Radar Module Alignment

The primary goal of a radar alignment process is to: A) Align the radar parallel to the ground (i.e. perpendicular to gravity), and B) Align the radar parallel to the vehicle's thrust access. A method of calibrating the radar module 101, attached to the vehicle is as follows. During an assembly process, the vehicle can be placed on a calibrated flat surface for measurements and determination of an accelerometer pitch. The radar module 101 is designed to read the internal sensor at a reasonable data rate, and perform any mathematical calculations to determine its orientation information. After determining this information, technicians would then turn adjuster screws (not shown) to bring the module into proper alignment. In the alternative, data directly from the radar 102 can be used to drive a nut-runner system (not shown), for closed loop alignment control of elevation.

Ideally, the orientation determination for accelerometer pitch alignment (using the internal x, y, z axis measurements to determine the radar's elevation (pitch) alignment) would be made while the vehicle is flat and stationary. However, when such determination is not possible, gravity can be used as a sole reference vector.

Additional steps to take with the vehicle to assist with accelerometer calibration could include: tilting/raising (jacking up) an end or side of vehicle a fixed known amount, using the internal x, y, z axis measurement to determine the module's azimuth (accelerometer yaw) alignment; using gravity accelerometer data as a reference vector (Z direction) and tilting the vehicle by lifting the front of the vehicle up a fixed height (h) above its resting position; driving (acceleration/deceleration) the vehicle in a fairly straight line; driving the vehicle over a known calibrated bump or small hill; and driving the vehicle and recording x, y, z data for a specified distance and time and post processing this data to determine the radar's azimuth (accelerometer yaw) alignment in relation to the vehicle's thrust access.

By continuously monitoring the internal accelerometer 104, and comparing results to the low-g 3-axis data available on a data bus from a tilt sensor 117 on the vehicle floor, inclination alignment of the radar 102 can be deduced. The floor mounted tilt sensor provides a reference for the tilt of the vehicle, so that the tilt of the radar 102 can be calculated in comparison. This computation would be performed many times through the controller 108 on a continuous basis, and a long-term average would be kept. Any accident that occurred, which might tilt the radar 102, would then show up in this ongoing measurement because the radar tilt would now associated differently vs. the vehicle floor tilt sensor on an ongoing basis. The on-going monitoring of the internal multi-axis sensor would also decode azimuth (accelerometer yaw) misalignment versus the thrust axis of the vehicle. More particularly, the controller 108 averages the tilt sensor output and the accelerometer output and determines a difference between the output averages, and reports when the differences change more than a predetermined amount.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A motor vehicle including:
   a vehicle floor,
   a tilt sensor attached to the vehicle floor and having an output,
   a forward-looking radar module attached to the vehicle, the radar module including a radar,
   an accelerometer; and
   an output from the accelerometer, and
   a controller that averages the tilt sensor output and the accelerometer output and determines a difference between the output averages, the controller reporting when the differences changes more than a predetermined amount.

2. Apparatus mounted on a vehicle for aligning an automotive forward-looking radar with the vehicle's thrust axis, the apparatus comprising:
   a tilt sensor attached to a vehicle floor and having an output;
   a forward-looking radar module attached to the vehicle, the radar module including a radar;
   an accelerometer having an output; and
   a controller adapted to
      receive the tilt sensor output and the accelerometer output;
      average the tilt sensor output and the accelerometer output;
      determine a difference between the output averages, and report when the difference changes more than a predetermined amount.

\* \* \* \* \*